May 8, 1923.  1,454,162
M. J. FURLONG
VEHICLE.
Filed Oct. 2, 1922   2 Sheets-Sheet 1
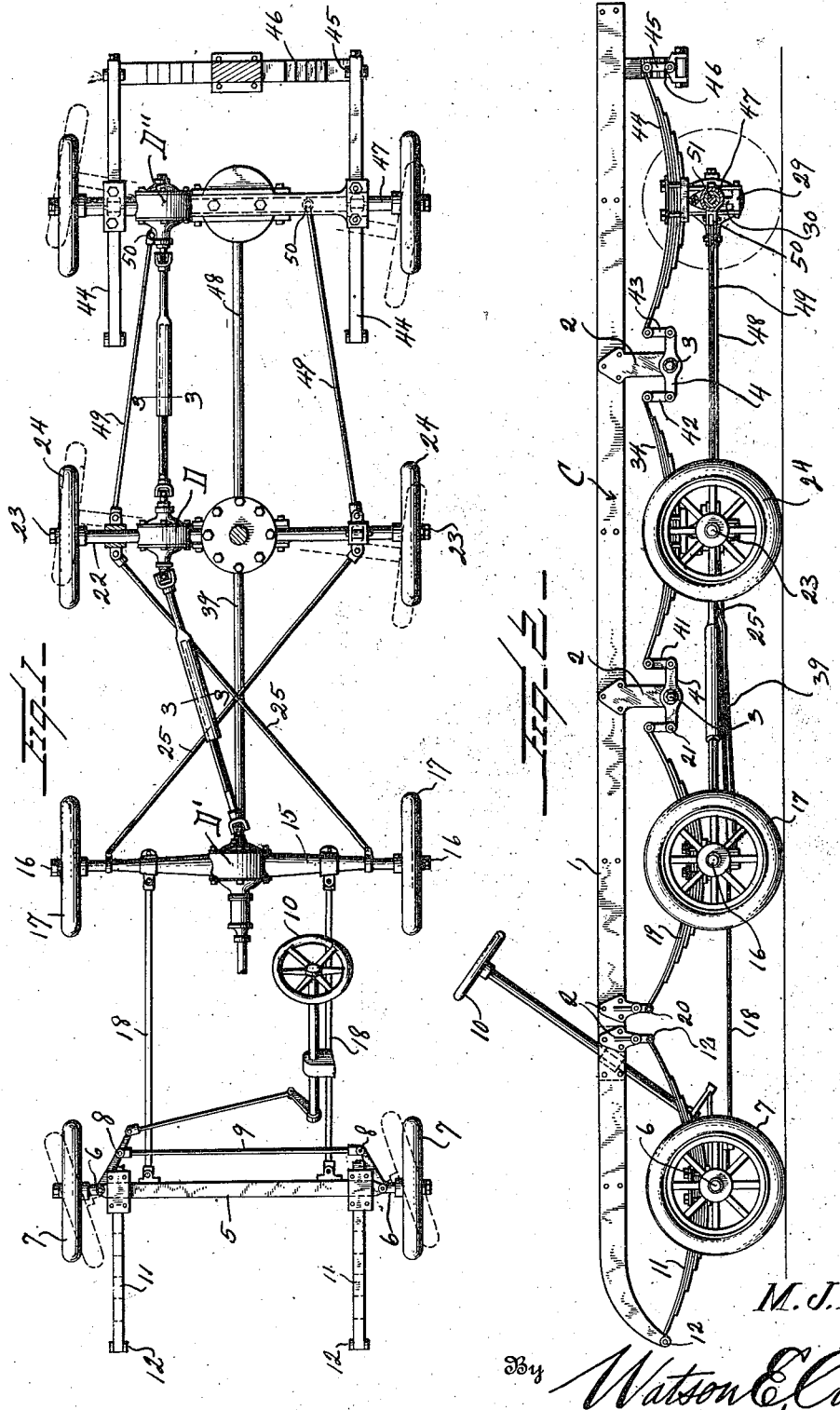

May 8, 1923.
M. J. FURLONG
VEHICLE
Filed Oct. 2, 1922
1,454,162
2 Sheets-Sheet 2
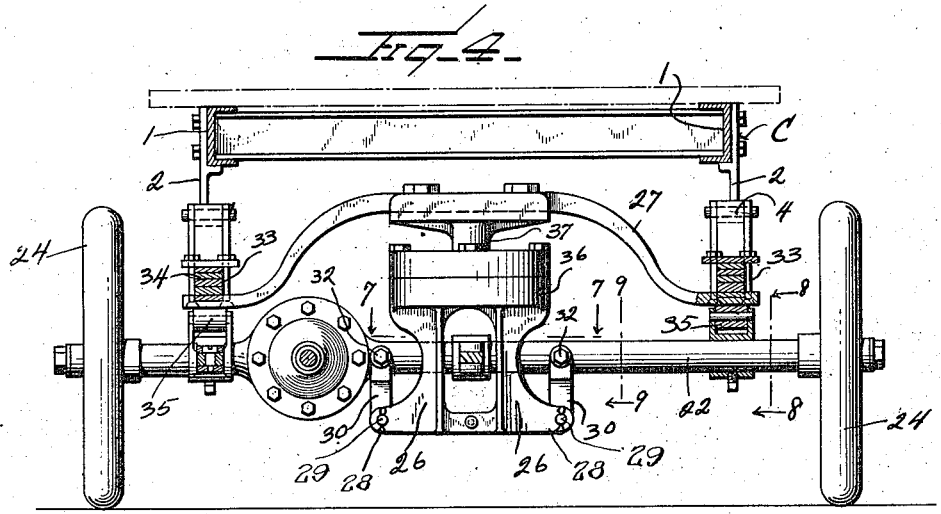
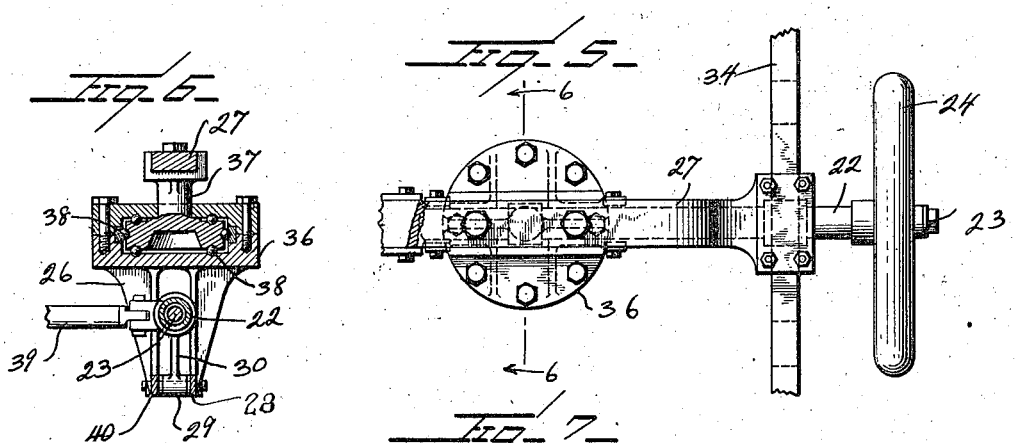
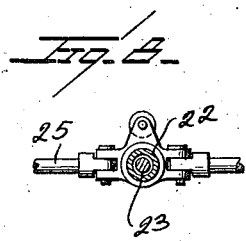
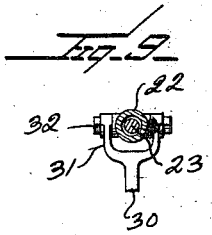
Inventor
M. J. Furlong.
By Watson E. Coleman
Attorney Patented May 8, 1923.

1,454,162

UNITED STATES PATENT OFFICE.

MARTIN J. FURLONG, OF HOUSTON, TEXAS.

VEHICLE.

Application filed October 2, 1922. Serial No. 591,855.

*To all whom it may concern:*

Be it known that MARTIN J. FURLONG, a citizen of the United States, residing at Houston, in the county of Harris and State of Texas, has invented certain new and useful Improvements in Vehicles, of which the following is a specification, reference being had to the accompanying drawings.

This invention relates to certain improvements in vehicles and relates more particularly to a special wheel base whereby a materially long body may be comprised in the vehicle and it is an object of the invention to provide novel and improved means whereby the steering of the vehicle is facilitated.

It is also an object of the invention to provide a novel and improved device of this general character comprising a wheel base including a plurality of axles provided with ground engaging wheels, one of said axles having swinging spindles associated therewith while the remainder of the axles have bodily swinging movement.

An additional object of the invention is to provide a novel and improved device of this general character wherein the frame or body of the vehicle is associated with the running gear in a manner to take care of or compensate for a certain degree of lateral swinging movement of the frame or body which occurs during the period the vehicle is being turned or changing its direction of travel and to facilitate one of the axles of the running gear to change its angularity to control the following axle or axles.

A further object of the invention is to provide a vehicle having a novel and improved running gear comprising a plurality of axles, certain of which have bodily swinging movement and wherein said bodily swinging axles have associated therewith pull rods to facilitate the functioning thereof.

The invention also has for an object to provide a vehicle of this general character embodying a novel and improved running gear wherein the bodily swinging axles comprised therein have associated therewith swinging saddles to facilitate the steering operation.

Furthermore, it is an object of the invention to provide a vehicle of this general character embodying a novel and improved running gear consisting of a plurality of axles and wherein two or more of said axles are positively driven.

The invention consists in the details of construction and in the combination and arrangement of the several parts of my improved vehicle whereby certain important advantages are attained and the device rendered simpler, less expensive, and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan and of a somewhat diagrammatic character illustrating a wheel base constructed in accordance with an embodiment of my invention, the second position of certain of the ground engaging wheels being indicated by dotted lines, the body of the vehicle being omitted.

Figure 2 is a view in side elevation of the structure as illustrated in Figure 1, a co-acting chassis or body being shown in applied position, a ground engaging wheel associated with the rear axle being indicated by dotted lines;

Figure 3 is a fragmentary sectional view taken substantially on the line 3—3 of Figure 1;

Figure 4 is a transverse sectional view taken through the rear portion of the vehicle as herein disclosed;

Figure 5 is a fragmentary view in top plan of the saddle and associated parts as particularly illustrated in Figure 4;

Figure 6 is a sectional view taken substantially on the line 6—6 of Figure 5;

Figure 7 is a sectional view taken substantially on the line 7—7 of Figure 4;

Figure 8 is a sectional view taken substantially on the line 8—8 of Figure 4;

Figure 9 is a sectional view taken substantially on the line 9—9 of Figure 4; and Figure 10 is a view of one of the hangers associated with the saddle.

As disclosed in the accompanying drawings, C denotes a chassis or body having depending from each side member 1 thereof at predetermined spaced points the brackets 2. Pivotally supported as at 3 by the rear brackets 2 are the equalizing bars 4 substantially horizontally disposed at all times.

Underlying the forward end portion of the chassis or body C is a front axle 5 provided at its opposite end portions with a swinging spindle 6 of a conventional type and mounted on each of said spindles is a front steering wheel 7. Associated with the spindles 6 are the rearwardly directed spindle arms 8 operatively connected by the steering rod 9 so that both of the wheels 7 will have lateral swinging movement in unison and in the same general direction as well known. The desired or lateral movement is imparted to the wheel 7 in a conventional manner upon proper rotation of the steering wheel 10.

The front axle 5 is of a floating type and each end portion is suitably secured to the center part of a semi-elliptical spring 11, one end of said spring being operatively engaged at 12 with the forward extremity of the adjacent side member 1 of the chassis or body C while the opposite or inner end portion of the spring is operatively engaged as at 12 with one of the depending brackets 2.

At a predetermined point rearwardly of the forward or front axle 6 is the transversely disposed casing 15 in which are mounted in a conventional manner the driving axles 16 to each of which is fixed a driving wheel 17, said wheels being adapted to be driven in a conventional manner by a suitable motor comprised in the vehicle structure. The opposite end portions of the front axle 6 and the casing 15 are connected by the brace rods 18.

Each end portion of the casing 15 is secured to the central portion of a semi-elliptical spring 19, the forward end portion of said spring being operatively engaged as at 20 to one of the brackets 2. An opposite or rear end portion of the spring 19 is operatively engaged as at 21 with the forward end portion of the forward equalizing bar 4.

Positioned a desired distance rearwardly of the casing 15 is a casing 22 adapted to have bodily swinging movement. Extending through the casing 22 is an axle 23 to the extremity of which are fixed the ground engaging wheels 24.

The opposite end portions of the casing 15 and the casing 22 are operatively connected by the cross rods 25 so that during a steering operation the movement of the casing 15 will result in the desired swinging movement being imparted to the casing 22. The casing 22 is disposed between depending spaced arms 26 carried by the saddle 27, each pair of arms 26 being to one side of the axial center of the saddle 27. The lower portions of the arms 26 are provided with the outwardly disposed extensions 28 and between each pair of which is pivotally connected as at 29 an end portion of a hanger 30, the opposite end portion of said hanger 30 being forked as at 31 to straddle the adjacent casing 22 from below for pivotal connection therewith as at 32. The connection afforded by the hangers 30 permit the body or chassis C to swing off of the central line in order to permit the casing 15 to change its angularity to control the desired movement of the casing 22. The saddle 27 comprises a spring member having its extremities operatively connected as at 33 with the central portion of the semi-elliptical spring 34, the under surface of the extremities of the saddle 27 contacting with the rollers 35 carried by and positioned above the casing 22. The extremities of the saddle 27 are of sufficient width to engage the rollers 35 when the casing 22 is swinging. The arms 26 hereinbefore referred to are directly carried by a central swinging saddle 36 which is supported for swinging movement between the headed depending member 37 carried by the saddle 27, said headed member 37 and central saddle 36 having associated therewith the anti-friction members 38 arranged as particularly illustrated in Figure 6 of the accompanying drawings whereby the central saddle 36 is capable of swinging movement with a minimum of frictional resistance. A central portion of the casing 15 and the central portion of the casing 22 are operatively connected by the pull rod 39, each connection, illustrated at 40 in Figure 6, being pivotal with the axis of such connection vertically disposed. Each of the springs 34 has its forward end portion operatively connected as at 41 with the rear extremity of the forward equalizing bar 4 and with the rear end portion of said spring 34 as at 42 has the forward end portion of the equalizing bar 4 carried by the bracket 2. The rear extremity of this last named bar 4 has operatively engaged therewith, as at 43, a forward end portion of a semi-elliptical spring 44. The rear portion of the spring 44 is operatively engaged as at 45 with the extremity of a semi-elliptical spring 46 extending transversely of the rear portion of the chassis or body 7.

Associated with the springs 44 is a rear casing 47 operatively engaged with the body or chassis C in the same manner which has hereinbefore been set forth with respect to the casing 22. The central portion of the casings 22 and 47 are also operatively connected by a pull rod 48. The opposite end portions of the casing 22 have operatively engaged therewith the rods 49 which are also operatively engaged as at 50 with the rear casing 47 but at points inwardly of the connection of the rods 40 with the casing 22. This arrangement is provided so that upon turning movement of the casing 22 the rear casing 47 will be caused to turn or swing to a greater degree than the casing 22 whereby the requisite turning movement of the vehicle is materially facilitated.

The axles 23 are associated with a differential D in driven connection with a differential D' associated with the axle 16. The differential D is also in driving connection with the differential D'' associated with the axles 51 arranged within the rear casing 47. By this means the axles 16, 23 and 51 are positively driven.

It is to be understood that the axles as defined by the appended claims include the associated casings.

From the foregoing description it is thought to be obvious that a vehicle constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A vehicle comprising a frame, a driving axle arranged beneath the frame intermediate the ends thereof and having the usual ground engaging wheels, a supporting and steering axle arranged beneath the axle forward of the driving axle and having the usual manually controlled steering wheels, a floating axle arranged below the frame rearwardly of the driving axle and having the usual ground engaging wheels, a member supported by the frame for rotation about a vertical axis, spaced members depending from said rotatable member at opposite sides of the axial center thereof and between which the floating axle is positioned, and means associated with the driving axle and the last named axle for imparting bodily swinging movement thereto during a turning movement of the vehicle.

2. A vehicle comprising a chassis, a driving axle arranged beneath the chassis intermediate the ends thereof and having the usual ground engaging wheels, a supporting and steering axle arranged beneath the axle forward of the driving axle and having the usual manually controlled steering wheels, a floating axle arranged below the chassis rearwardly of the driving axis and having the usual ground engaging wheels, a member supported by the chassis for rotation about a vertical axis, spaced members depending from said rotatable member at opposite sides of the axial center thereof and between which the floating axle is positioned, means associated with the driving axle and the last named axle for imparting bodily swinging movement thereto during a turning movement of the vehicle, and a pull rod connecting the driving axle and the floating axle.

3. A vehicle comprising a frame, a driving axle arranged beneath the frame intermediate the ends thereof and having the usual ground engaging wheels, a supporting and steering axle arranged beneath the axle forward of the driving axle and having the usual manually controlled steering wheels, a floating axle arranged below the frame rearwardly of the driving axis and having the usual ground engaging wheels, a spring saddle disposed transversely of the frame, a rotatable member supported by the saddle for rotation about substantially a vertical axis, spaced members depending from said rotatable member at opposite sides of the axial center thereof and between which the floating axle is positioned, and means associated with the driving axle and the last named axle for imparting bodily swinging movement thereto during a turning movement of the vehicle.

4. A vehicle comprising a frame, a driving axle arranged beneath the frame intermediate the ends thereof and having the usual ground engaging wheels, a supporting and steering axle arranged beneath the axle forward of the driving axle and having the usual manually controlled steering wheels, a floating axle arranged below the frame rearwardly of the driving axis and having the usual ground engaging wheels, a spring saddle disposed transversely of the frame, a rotatable member supported by the saddle for rotation about substantially a vertical axis, spaced members depending from said rotatable member at opposite sides of the axial center thereof and between which the floating axle is positioned, and means associated with the driving axle and the last named axle for imparting bodily swinging movement thereto during a turning movement of the vehicle, the extremities of the saddle being slidably supported by the floating axle.

5. A vehicle comprising a frame, an axle arranged beneath the frame, means yieldably carried by the frame for supporting said axle and for endwise shifting movement for bodily swinging movement about a vertical axis, and means for imparting swinging movement to said axle.

6. A vehicle comprising a frame, a swinging saddle disposed transversely of the frame, a floating axle positioned below the saddle, a member supported by the saddle for rotation about a substantially vertical axis, members depending from the rotatable member at opposite sides of the axial center thereof and between which the axle is positioned, operative connections between said members and the axle, and means for swinging the axle.

7. A vehicle comprising a frame, a floating axle arranged beneath the frame, a member supported by the chassis for rotation about a substantially vertical axis, spaced members depending from said rotatable member and between which the floating axle is positioned, said members extending below the axle, hangers operatively engaged with the lower portions of the members and the axle, and means for imparting swinging movement to the axle.

8. A vehicle comprising a frame, a floating axle arranged below said frame, a swinging saddle disposed transversely of the axle, a rotatable member supported by the saddle for rotation about a substantially vertical axis, members depending from said rotatable member between which the floating axle is positioned, the extremities of the saddle being slidably supported by the axle, and means for imparting swinging movement to the axle.

9. A vehicle comprising a frame, relative stationary springs carried by the opposite side portions of the frame, a saddle supported by the springs, an axle, and an operative connection between the saddle and axle to permit the axle to have bodily swinging movement about a vertical axis and to have endwise shifting movement, and means for imparting swinging movement to the axle.

10. A vehicle comprising a frame, relative stationary springs carried by the frame, an axle operatively supported by the springs for bodily swinging movement about a vertical axis and for endwise shifting movement, and means for imparting swinging movement to the axle.

11. A vehicle comprising a frame, an axle arranged beneath the frame, a member supported by the frame for rotation about substantially a vertical axis, spaced members depending from said rotatable member and between which the axle is positioned, said member extending below the axle, operative connections between said members and the axle, and means for imparting swinging movement to the axle.

In testimony whereof I hereunto affix my signature.

MARTIN J. FURLONG.